United States Patent
Hong et al.

(10) Patent No.: US 9,919,725 B2
(45) Date of Patent: Mar. 20, 2018

(54) STEERING COLUMN

(71) Applicant: NAMYANG IND. CO., LTD, Ansan-si, Gyeonggi-do (KR)

(72) Inventors: Sung Jong Hong, Seoul (KR); Doo Hyuk Kim, Gunpo-si (KR); In Sun Hwang, Ansan-si (KR); Kyung Hwan Moon, Gunpo-si (KR); Jung Mun Lim, Siheung-si (KR)

(73) Assignee: NAMYANG IND. CO., LTD, Ansan-si, Gyeonggi-do (KR)

( * ) Notice: Subject to any disclaimer, the term of this patent is extended or adjusted under 35 U.S.C. 154(b) by 0 days.

(21) Appl. No.: 15/307,605

(22) PCT Filed: Apr. 28, 2015

(86) PCT No.: PCT/KR2015/004275
§ 371 (c)(1),
(2) Date: Oct. 28, 2016

(87) PCT Pub. No.: WO2015/167234
PCT Pub. Date: Nov. 5, 2015

(65) Prior Publication Data
US 2017/0043802 A1    Feb. 16, 2017

(30) Foreign Application Priority Data

Apr. 28, 2014  (KR) .......................... 10-2014-0050509
Apr. 17, 2015  (KR) .......................... 10-2015-0054748

(51) Int. Cl.
*B62D 1/184*    (2006.01)
*B62D 1/187*    (2006.01)
(Continued)

(52) U.S. Cl.
CPC ............ *B62D 1/184* (2013.01); *B62D 1/187* (2013.01); *B62D 1/189* (2013.01); *B62D 1/195* (2013.01)

(58) Field of Classification Search
CPC combination set(s) only.
See application file for complete search history.

(56) References Cited

U.S. PATENT DOCUMENTS 3,991,859 A * 11/1976 Coulter .................. F16D 65/18
                                                                188/106 F
4,267,742 A *  5/1981 Cabeza ................ B62M 25/045
                                                                 74/471 R
(Continued)

FOREIGN PATENT DOCUMENTS

JP    2006-111093 A    4/2006
KR   20-2000-0017738 U   10/2000
(Continued)

OTHER PUBLICATIONS

International Search Report for PCT/KR2015/004275 dated Jul. 23, 2015 from Korean Intellectual Property Office.

*Primary Examiner* — Nicole T Verley
(74) *Attorney, Agent, or Firm* — Paratus Law Group, PLLC

(57) ABSTRACT

Disclosed herein is a steering column including a mounting bracket, a housing rotated in upward and downward directions relative to the mounting bracket, an inner tube installed in a hollow of the housing so as to be axially extensible and contractible, an operating lever installed to the mounting bracket and an adjustment bolt passing through the housing so as to be tightened and released, a telescopic assembly including a fixed gear installed on the inner tube and a movable gear engaged with the fixed gear depending on (Continued)

axial movement of the adjustment bolt, and a bending plate provided between the inner tube and the fixed gear.

11 Claims, 10 Drawing Sheets

(51) Int. Cl.
    *B62D 1/189*    (2006.01)
    *B62D 1/19*    (2006.01)

(56) References Cited

U.S. PATENT DOCUMENTS

| | | | | |
|---|---|---|---|---|
| 5,088,767 A * | 2/1992 | Hoblingre | ................ | F16B 2/16 280/775 |
| 5,213,004 A * | 5/1993 | Hoblingre | ............. | B62D 1/184 403/92 |
| 5,394,767 A * | 3/1995 | Hoblingre | ............. | B62D 1/184 188/72.7 |
| 5,921,577 A * | 7/1999 | Weiss | .................... | B62D 1/184 280/775 |
| 6,419,269 B1 * | 7/2002 | Manwaring | ............ | B62D 1/184 280/775 |
| 6,467,367 B2 * | 10/2002 | Kim | ...................... | B62D 1/184 280/775 |
| 7,010,996 B2 * | 3/2006 | Schick | .................. | B62D 1/184 280/775 |
| 7,052,043 B2 * | 5/2006 | Lee | ........................ | B62D 1/184 280/775 |
| 7,083,198 B2 * | 8/2006 | Lee | ........................ | B62D 1/184 280/775 |
| 7,350,814 B2 * | 4/2008 | Hong | .................... | B62D 1/184 280/775 |
| 7,415,908 B2 * | 8/2008 | Zernickel | ............... | B62D 1/184 280/775 |
| 7,587,959 B2 * | 9/2009 | Ridgway | ................ | B62D 1/184 280/775 |
| 7,735,868 B2 * | 6/2010 | Ridgway | ................ | B62D 1/184 280/775 |
| 7,798,037 B2 * | 9/2010 | Tinnin | ................... | B62D 1/184 280/775 |
| 7,878,543 B2 * | 2/2011 | Bodtker | ................ | B62D 1/184 280/775 |
| 8,438,944 B2 * | 5/2013 | Ridgway | ................ | B62D 1/195 280/775 |
| 8,590,932 B2 * | 11/2013 | Dietz | ..................... | B62D 1/184 280/775 |
| 8,641,095 B2 * | 2/2014 | Uesaka | .................. | B62D 1/184 280/775 |
| 8,826,767 B2 * | 9/2014 | Maniwa | ................. | B62D 1/184 280/775 |
| 8,881,618 B2 * | 11/2014 | Buzzard | ................ | B62D 1/184 280/775 |
| 9,283,982 B2 * | 3/2016 | Hong | .................... | B62D 1/184 |
| 9,393,986 B1 * | 7/2016 | Anspaugh | .............. | B62D 1/184 |
| 9,415,793 B2 * | 8/2016 | Kubota | .................. | B62D 1/184 |
| 9,522,693 B2 * | 12/2016 | Tomaru | ................. | B62D 1/184 |
| 9,545,943 B2 * | 1/2017 | Sakuda | .................. | B62D 1/185 |
| 2005/0178231 A1 * | 8/2005 | Schick | ................... | B62D 1/184 74/493 |
| 2006/0169088 A1 * | 8/2006 | Jones | .................... | B62D 1/184 74/493 |
| 2006/0196302 A1 * | 9/2006 | Hochmuth | ............ | B62D 1/184 74/492 |
| 2006/0273567 A1 * | 12/2006 | Fix | ........................ | B62D 1/184 280/775 |
| 2007/0234845 A1 * | 10/2007 | Gist, Jr. | ................. | B62D 1/184 74/569 |
| 2008/0023952 A1 * | 1/2008 | Manwaring | ............ | B62D 1/195 280/777 |
| 2009/0019963 A1 * | 1/2009 | Hubrecht | ............... | B62D 1/184 74/493 |
| 2009/0095114 A1 * | 4/2009 | Ridgway | ................ | B62D 1/181 74/493 |
| 2009/0114055 A1 * | 5/2009 | Stroud | ................... | B62D 1/184 74/493 |
| 2016/0280248 A1 * | 9/2016 | Uesaka | .................. | B62D 1/195 |
| 2017/0057535 A1 * | 3/2017 | Vermeersch | .......... | B62D 1/184 |
| 2017/0361862 A1 * | 12/2017 | Charvet | ................ | B62D 1/184 |

FOREIGN PATENT DOCUMENTS

| | | |
|---|---|---|
| KR | 10-0408774 B1 | 2/2004 |
| KR | 10-2005-0056295 A | 6/2005 |
| KR | 10-2007-0075111 A | 7/2007 |

* cited by examiner

-Related Art-

-Related Art-

STEERING COLUMN

CROSS REFERENCE TO PRIOR APPLICATIONS

This application is a National Stage Patent Application of PCT International Patent Application No. PCT/KR2015/004275 (filed on Apr. 28, 2015) under 35 U.S.C. § 371, which claims priority to Korean Patent Application Nos. 10-2014-0050509 (filed on Apr. 28, 2014) and 10-2015-0054748 (filed on Apr. 17, 2015), which are all hereby incorporated by reference in their entirety.

TECHNICAL FIELD

The present invention relates to a steering column, and more particularly, to a steering column having the same energy absorption characteristics for each tele-position. In addition, the present invention relates to a steering column having an improved telescopic structure such that the movement of the steering column can be controlled in a tele-direction by engagement of a fixed gear with a movable gear of a fixing unit, which rectilinearly moves, when an operating lever is operated.

BACKGROUND ART

In general, a steering column is a device which surrounds and rotatably supports a steering shaft for transferring torque, generated by operating a steering wheel by a driver, to a rack-pinion mechanism while being coupled to a vehicle body through a bracket to fix the position of the steering shaft.

The steering column may have a telescopic or tilt function for the convenience of drivers. The tilt function serves to adjust the fixed angle of the steering wheel. The telescopic function allows two hollow pipes to be axially extensible and contractible by inserting the hollow pipes into the steering column, and also serves to absorb impact energy through the collapse of the steering shaft and the steering column in the event of collision of vehicles.

Accordingly, the steering column is classified into a telescopic steering column and a tilt steering column depending on the function thereof. In some cases, a tilt function may also be added to the telescopic steering column. Through such a tilt function, a driver may smoothly operate the steering wheel by adjusting the protruding or tilt angle of the steering wheel so as to be suitable for his/her height or body.

The telescopic or tilt operation of the steering column is typically performed by pressing a housing or releasing the pressing thereof according to tightening or releasing an operating lever.

In particular, the telescopic operation of the steering column is mostly performed by pressing the housing or releasing the pressing thereof.

Representative examples of steering columns are illustrated in FIGS. 1 and 2, and conventional steering columns will be described in brief with reference to FIGS. 1 and 2.

As illustrated in FIG. 1, the steering column according to the related art 1 includes a mounting bracket 10 installed in a vehicle, a housing 20 installed in the mounting bracket 10, and an operating lever 30 for pressing the tilt bracket 10 and the housing 20 or releasing the pressing thereof.

In addition, the housing 20 is formed with a slit 21 for pressing an inner tube 40, and a telescopic guide 22 through which an adjustment bolt 31 of the operating lever 30 slides.

However, in the steering column of the related art 1, the deformation of the housing 20 varies due to the slit 21 and the telescopic guide 22, which may lead to a variation in fixing force of the operating lever 30.

In addition, the adjustment bolt 31 must be moved to the tele-in position (the right in FIG. 1) of the telescopic guide 22 in order to absorb impact energy through the collapse of the steering column in the event of collision of a vehicle. Hence, the steering column has different energy absorption characteristics for each tele-position.

As illustrated in FIG. 2, the steering column according to the related art 2 includes a tilt bracket 10' installed in a vehicle, a housing 20' installed in the tilt bracket 10', an operating lever 30' for pressing the tilt bracket 10' and the housing 20' or releasing the pressing thereof, and an inner tube 40' inserted into the hollow of the housing 20'.

In addition, the inner tube 40' is formed with a telescopic guide 41' through which an adjustment bolt 31' of the operating lever 30' slides.

In the steering column of the related art 2, the housing 20' is fixed, and thus no variation in operating force of the operating lever 30' occurs.

However, even in the steering column of the related art 2, the adjustment bolt 31' must be moved to the tele-in position (the right in FIG. 2) of the telescopic guide 41' in order to absorb impact energy through the collapse of the steering column in the event of collision of a vehicle. Hence, the steering column has different energy absorption characteristics for each tele-position.

Accordingly, it is necessary to develop a steering column having the same energy absorption characteristics for each tele-position while an operating lever has the same operating force for each tele-position.

DISCLOSURE

Technical Problem

Accordingly, the present invention has been made in view of the above-mentioned problems, and an object thereof is to provide a steering column which has the same energy absorption characteristics for each tele-position while an operating lever has the same operating force for each tele-position, and the movement of which can be controlled in a tele-direction by engagement of a fixed gear with a movable gear when the operating lever is operated while the steering column has the reduced number of parts and a reduced weight.

Technical Solution

In accordance with an aspect of the present invention, a steering column includes a mounting bracket, a housing rotated in upward and downward directions relative to the mounting bracket, an inner tube installed in a hollow of the housing so as to be axially extensible and contractible, an operating lever installed to the mounting bracket and an adjustment bolt passing through the housing so as to be tightened and released, a telescopic assembly including a fixed gear installed on the inner tube and a movable gear engaged with the fixed gear depending on axial movement of the adjustment bolt, and a bending plate provided between the inner tube and the fixed gear.

The bending plate may be rolled and inserted into the fixed gear when the inner tube is axially contracted relative to the housing.

The inner tube may be fastened to the fixed gear by a rivet, and the rivet may be destroyed when a load, which is equal to or greater than a predetermined value, is axially applied to the inner tube.

The fixed gear may have a receiving groove into which the bending plate is inserted, and the bending plate may have a restraint end fixed to the inner tube while being inserted into the receiving groove, and a free end exposed to the outside of the fixed gear.

The fixed gear may have a guide member for guiding the bending plate into the receiving groove.

The bending plate may have a "U"-bent shape.

The steering column may further include a tilting assembly coupled to both sides of the inner tube, and rotating the housing in the upward and downward directions relative to the mounting bracket when the operating lever is operated, and a fixing unit mounted to the other side of the adjustment bolt, the fixing unit being rectilinearly moved depending on operation of the operating lever so that the movable gear is engaged with or disengaged from the fixed gear, thereby fixing or releasing the tilting assembly.

The housing may have a right coupling part, a portion of which has a bush mounting hole and a spring support hole formed therein being disposed at an upper portion of the fixed gear while protruding inward from the right coupling part, and a gear guide part may be formed outside the spring support hole in a stepped manner so as to rectilinearly move the movable gear.

The gear guide part may be cut and formed so as to support a portion of an upper portion of and an entire lower portion of the movable gear.

The fixing unit may include a fixing bush mounted to the adjustment bolt while being located at a right coupling part of the housing, a spring mounted to the adjustment bolt while being located outside the fixing bush, a bush tube mounted to the adjustment bolt while being located outside the movable gear located outside the spring, and a washer and a nut coupled to the adjustment bolt while being located outside the bush tube.

The movable gear may have a spring support part and a tube support part formed in a stepped manner at both sides thereof on the basis of a shaft through-hole through which the adjustment bolt passes, and the movable gear may have a gear coupling part elongated and formed at a lower portion thereof, the gear coupling part being engaged with or disengaged from the fixed gear.

The gear coupling part may have the same width as the tube support part so as to be smoothly engaged with or disengaged from the fixed gear formed on the inner tube.

Advantageous Effects

In accordance with a steering column of the present invention, no variation in operating force of an operating lever for each tele-position can occur by engagement of a fixed gear with a movable gear. That is, the usability of the operating lever can be consistently maintained by minimizing the variation in operating force of the operating lever, thereby improving the emotional quality of product.

In addition, when an impact is axially applied to an inner tube, an energy absorption function is immediately activated by the engagement of the fixed gear with the movable gear and thus the steering column can have the same energy absorption characteristics for each tele-position. This is because the collapse is performed in the state in which the inner tube is not moved to a tele-in position by the engagement of the fixed gear with the movable gear in the present invention, unlike the conventional technique that absorbs energy after an inner tube forcibly slides to a tele-in position.

In addition, since the movable gear is engaged with the fixed gear while rectilinearly moving by the tension of a spring when the operating lever is operated, it is possible to prevent the variation in operating force of the operating lever from occurring for each tele-position.

In addition, when an impact is axially applied to a bush tube, the energy absorption function is immediately activated by the engagement of the fixed gear with the movable gear and thus the steering column can have the same energy absorption characteristics for each tele-position.

In addition, since the spring is supported by the housing and the movable gear when the spring is operated depending on the operation of the operating lever, it is possible to prevent unstable movement and occurrence of noise.

In addition, the rotation of the movable gear can be prevented owing to moment by the tension of the spring when the operating lever is operated, by increasing the connection overlap between the movable gear and the bush tube, thereby preventing the movable gear from unstably engaging with the fixed gear.

BEST MODE FOR INVENTION

Reference will now be made in detail to exemplary embodiments of the present invention, examples of which are illustrated in the accompanying drawings.

Figure 1:
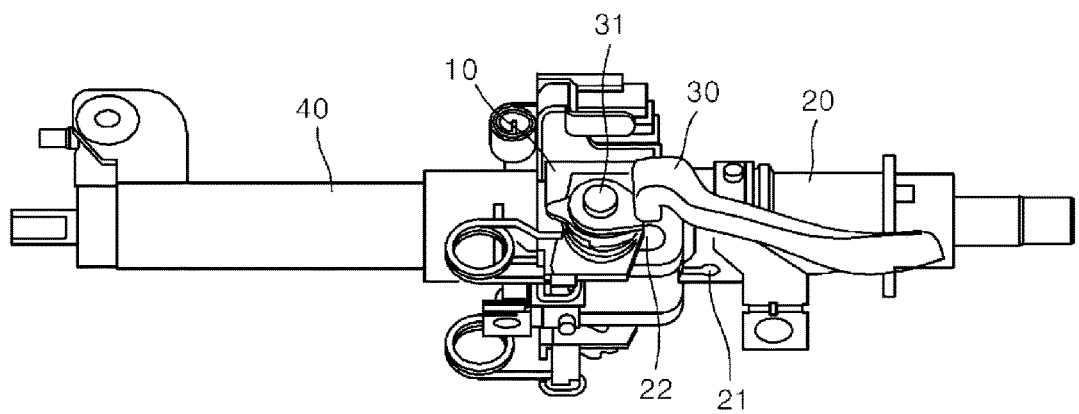
FIG. 1 is a view illustrating a steering column according to the related art 1.
Figure 2:
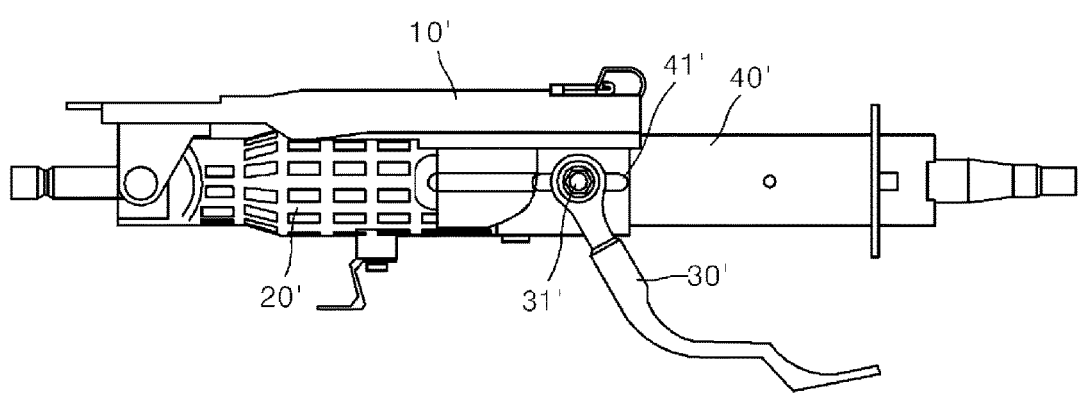
FIG. 2 is a view illustrating a steering column according to the related art 1.
Figure 3:
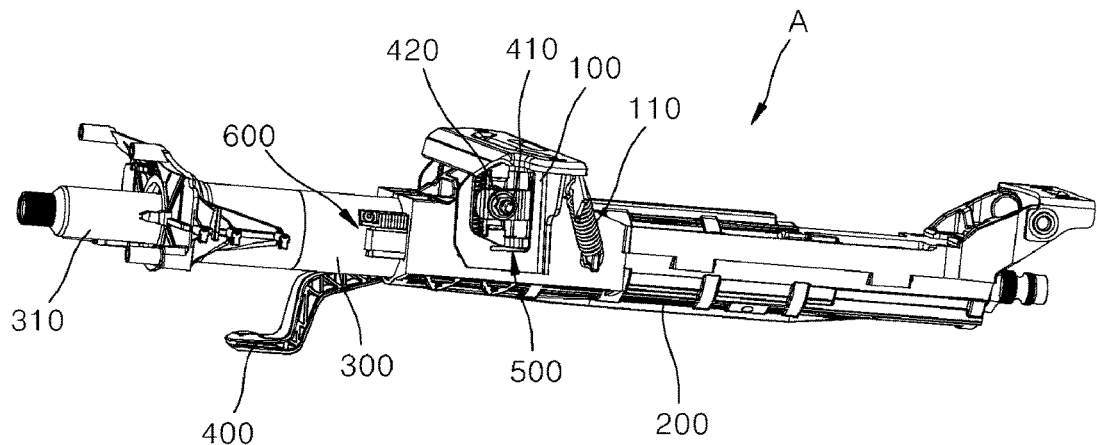
FIG. 3 is a perspective view illustrating a steering column according to an embodiment of the present invention.
Figure 4:
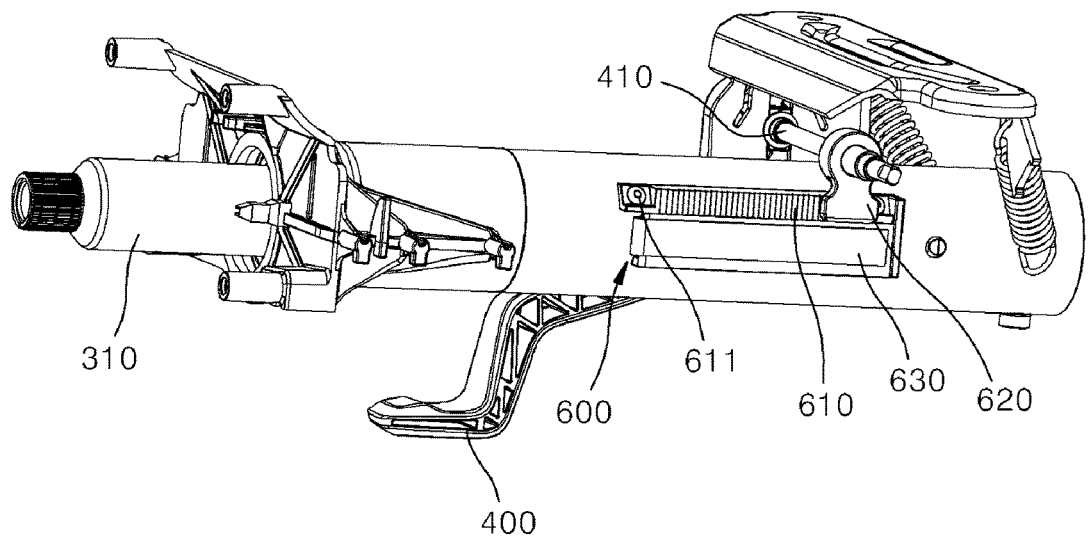
FIG. 4 is a perspective view illustrating a state in which a mounting bracket is removed from the steering column of FIG. 3.
Figure 5:
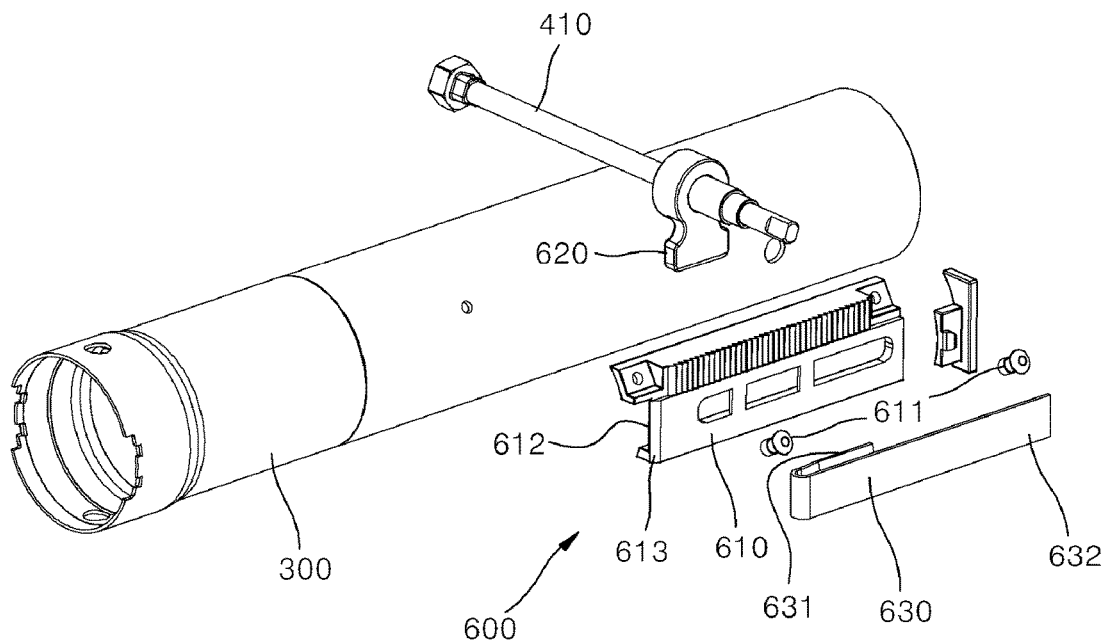
FIG. 5 is an exploded perspective view illustrating a telescopic assembly of FIG. 4.
Figure 6:
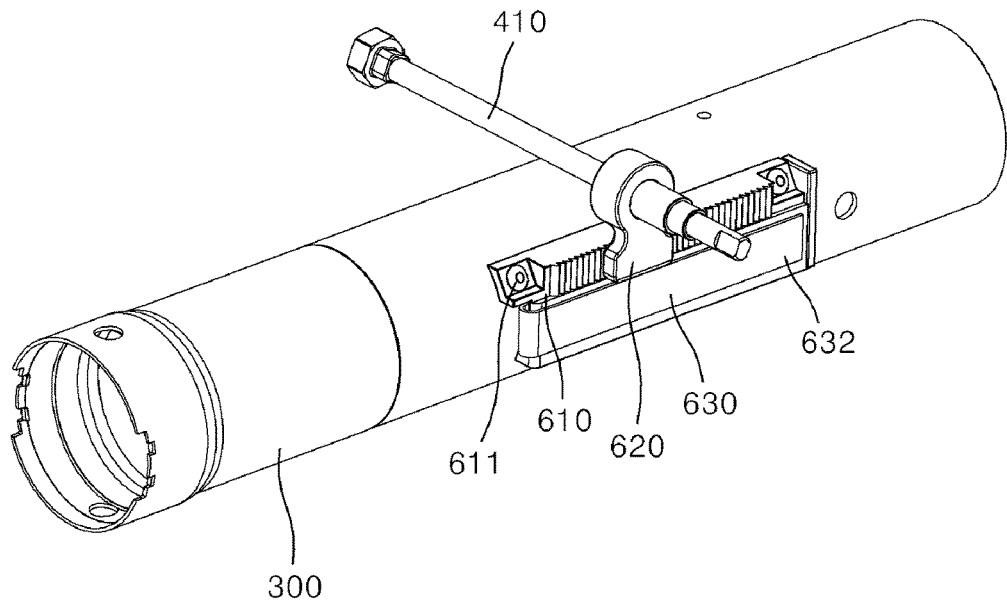
FIGS. 6 to 8 are perspective views illustrating the operation of the telescopic assembly.
Figure 7:
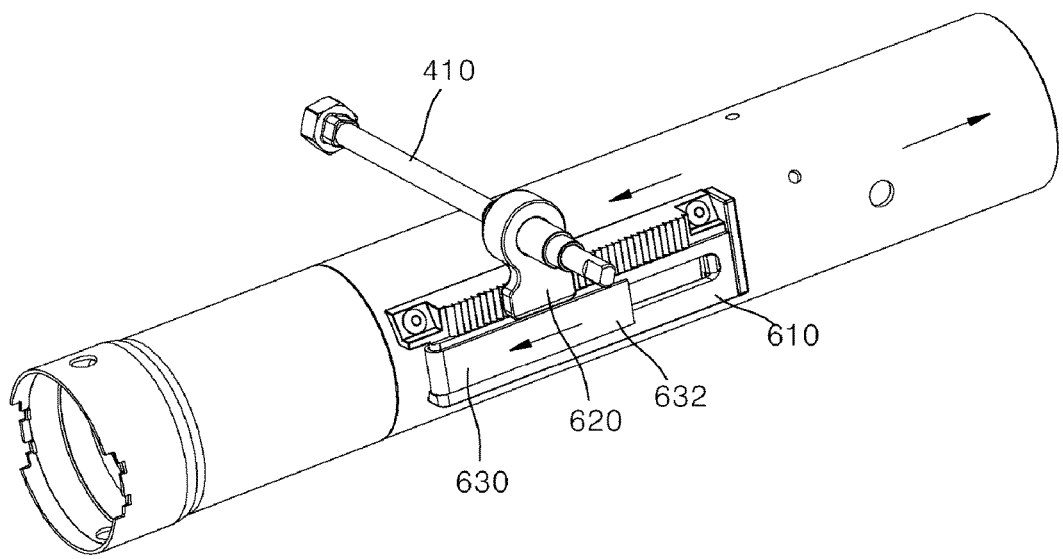
Figure 8:
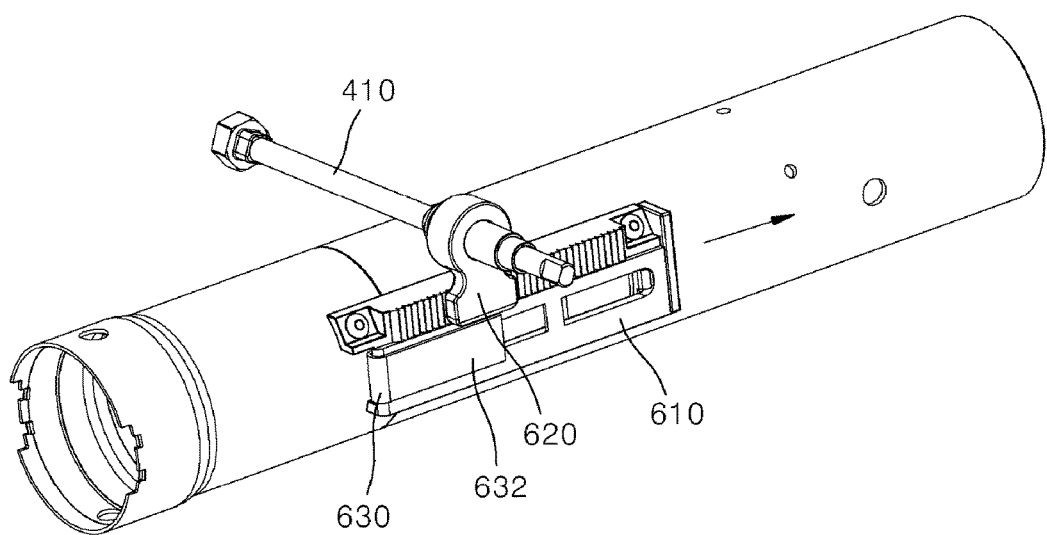

FIG. 3 is a perspective view illustrating a steering column according to an embodiment of the present invention. FIG. 4 is a perspective view illustrating a state in which a mounting bracket is removed from the steering column of FIG. 3. FIG. 5 is an exploded perspective view illustrating a telescopic assembly of FIG. 4. FIGS. 6 to 8 are perspective views illustrating the operation of the telescopic assembly.

As illustrated in FIGS. 3 to 8, the steering column, which is designated by reference numeral A, according to the embodiment of the present invention includes a mounting bracket 100 which is fixedly attached to a vehicle, a housing 200 which is installed in the mounting bracket 100 to rotate relative to the mounting bracket 100, an inner tube 300 which is installed in the hollow of the housing 200 to be axially extensible and contractible and has a hollow shape so as to surround a steering shaft 310, and an operating lever 400 which is installed to the mounting bracket 100 and an adjustment bolt 410 passing through the housing 200 so that the steering column A is telescoped or tilted by tightening and releasing the operating lever 400.

In addition, the steering column A further includes a tilting assembly 500 which is provided between the mounting bracket 100 and the housing 200 so as to adjust the tilting of the housing 200. The tilting assembly 500 adjusts the tilting of the steering column by engagement of a fixed gear with a movable gear.

The adjustment bolt 410 connected to the operating lever 400 is fixed through the tilting assembly 500 by a nut 420. Meanwhile, the operating lever 400 and the adjustment bolt 410 are equipped with a driving cam and a driven cam, on which ridge and valley portions are repeatedly formed. Thus, the adjustment bolt 410 is longitudinally and linearly moved by the rotation of the operating lever 400, thereby tightening and releasing the tilting assembly 500 and a telescopic assembly 600 to be described later.

In addition, a return spring 110 is installed between the mounting bracket 100 and the housing 200.

The steering column A further includes a telescopic assembly 600 which fixes or releases the axial movement of the inner tube 300 depending on the axial movement of the adjustment bolt 410.

Sine the other components of the steering column may adopt conventionally known components, a detailed description thereof will be omitted.

Hereinafter, the telescopic assembly 600 according to the embodiment of the present invention will be described.

The telescopic assembly 600 includes a fixed gear 610 which is installed on the outer peripheral surface of the inner tube 300, and a movable gear 620 which is fixed on the adjustment bolt 410 and is engaged with the fixed gear 610.

Thus, no variation in operating force of the operating lever 400 for each tele-position may occur by the engagement of the fixed gear 610 with the movable gear 620.

This is because the fixed gear 610 engages with the movable gear 620 by the operation of the operating lever 400 and the steering column A is thus adjusted in a telescopic manner in the present invention, unlike the conventional technique that presses or releases a target to be fixed using an operating lever.

That is, the usability of the operating lever 400 is consistently maintained by minimizing the variation in operating force of the operating lever 400, thereby improving the emotional quality of product.

In addition, the steering column A further includes a bending plate 630 which is provided between the inner tube 300 and the fixed gear 610. The bending plate 630 is rolled and inserted into the fixed gear 610 when the inner tube 300 is axially contracted relative to the housing 200.

Thus, the bending plate 630 functions to absorb impact energy while collapsing.

The inner tube 300 is fastened to the fixed gear 610 by a rivet 611, and the rivet 611 is configured to be destroyed when a load, which is equal to or greater than a predetermined value, is axially applied to the inner tube 300. The rivet 611 may have a "V"-shaped cutting groove so as to be cut under a predetermined load or more, or may be made of a material in which the rivet itself is broken under a predetermined load.

Meanwhile, the fixed gear 610 has a receiving groove 612 into which the bending plate 630 is inserted. The bending plate 630 has a restraint end 631 which is inserted into the receiving groove 612 and is fixed to the inner tube 300 and a free end 632 which is exposed to the outside of the fixed gear 610. The restraint end 631 of the bending plate 630 is fixed to the inner tube 300 by welding or mechanism means.

In addition, the fixed gear 610 further has a guide member 613 which guides the bending plate 630 into the receiving groove 612 so that the bending plate 630 is rolled and inserted into the receiving groove 612.

The bending plate 630 has a "U"-bent shape, and is rolled and inserted into the receiving groove 612.

Accordingly, when an impact is axially applied to the inner tube 300, a collapse function (an energy absorption function) is immediately activated by the engagement of the fixed gear 610 with the movable gear 620 and thus the steering column has the same energy absorption characteristics for each tele-position.

This is because the collapse is performed in the state in which the inner tube 300 is not moved to a tele-in position by the engagement of the fixed gear 610 with the movable gear 620 in the present invention, unlike the conventional technique that absorbs energy after an inner tube forcibly slides to a tele-in position.

In this case, the energy generated by the contraction of the inner tube 300 due to an axial impact applied thereto is absorbed while the bending plate 630 is rolled and inserted into the receiving groove 612 by the guide member 613, as illustrated in FIGS. 7 and 8.

Meanwhile, a steering column A according to another embodiment of the present invention may further include a fixing unit 700 which rectilinearly moves depending on the operation of an operating lever 400 and operates or stops a tilting assembly 500, such that a movable gear 620 is engaged with or disengaged from a fixed gear 610. A description thereof will be given later in detail with reference to the drawings.

Figure 9:
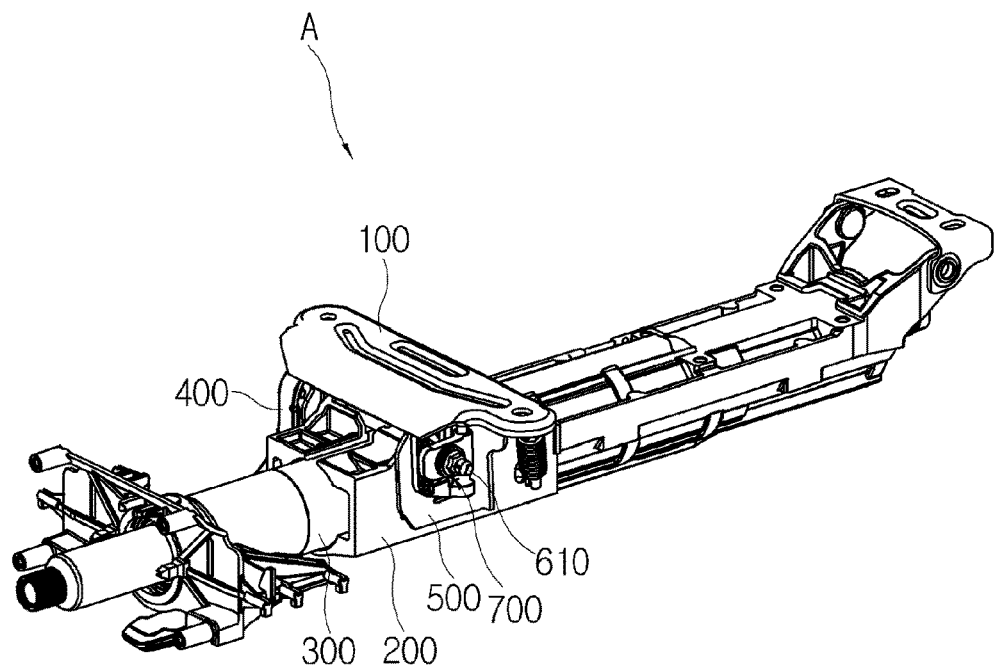
FIG. 9 is an assembled perspective view illustrating a steering column according to another embodiment of the present invention.
Figure 10:
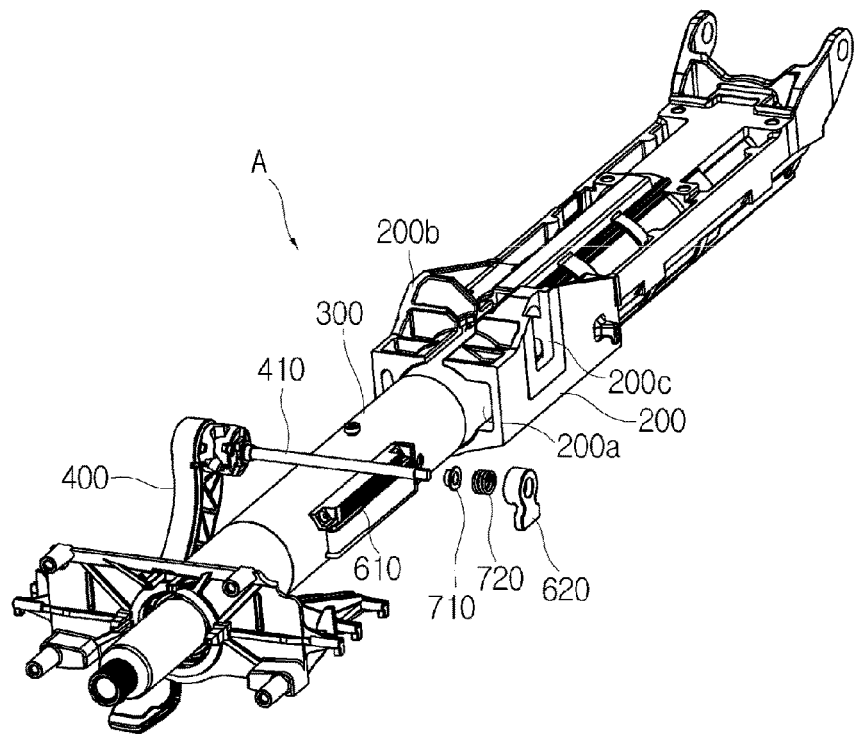
FIG. 10 is an exploded perspective view of the steering column illustrated in FIG. 9.
Figure 11:
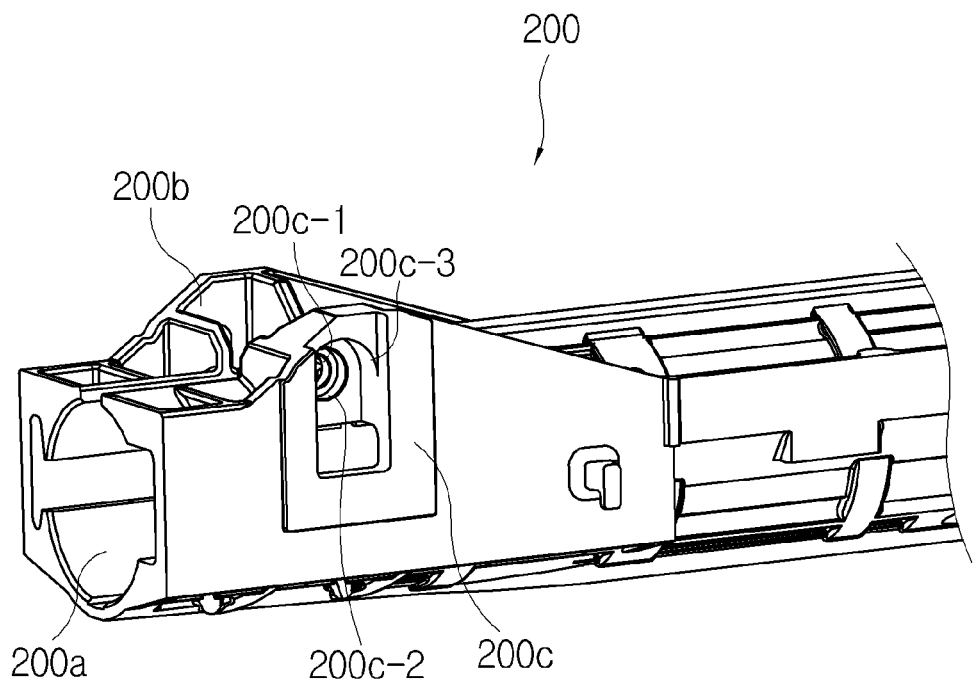
FIG. 11 is a partially expanded perspective view illustrating a housing constituting the steering column illustrated in FIG. 9.
Figure 12:
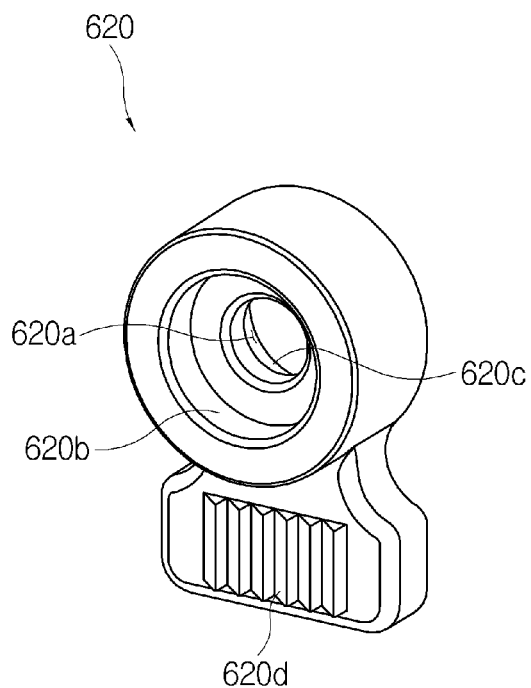
FIG. 12 is a perspective view illustrating a movable gear of the steering column illustrated in FIG. 9.
Figure 13:
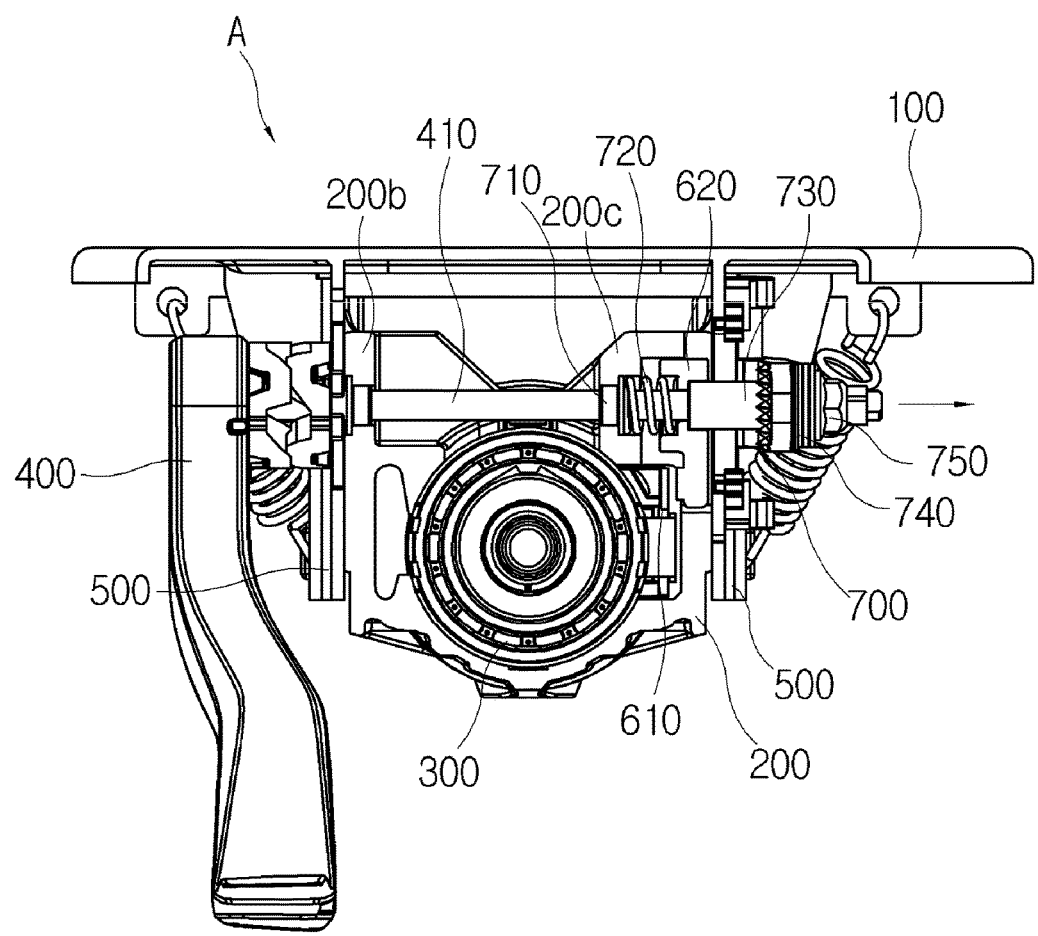
FIG. 13 is a front view illustrating a state in which a fixed gear is disengaged from a fixing unit when an operating lever constituting the steering column illustrated in FIG. 9 is operated.
Figure 14:
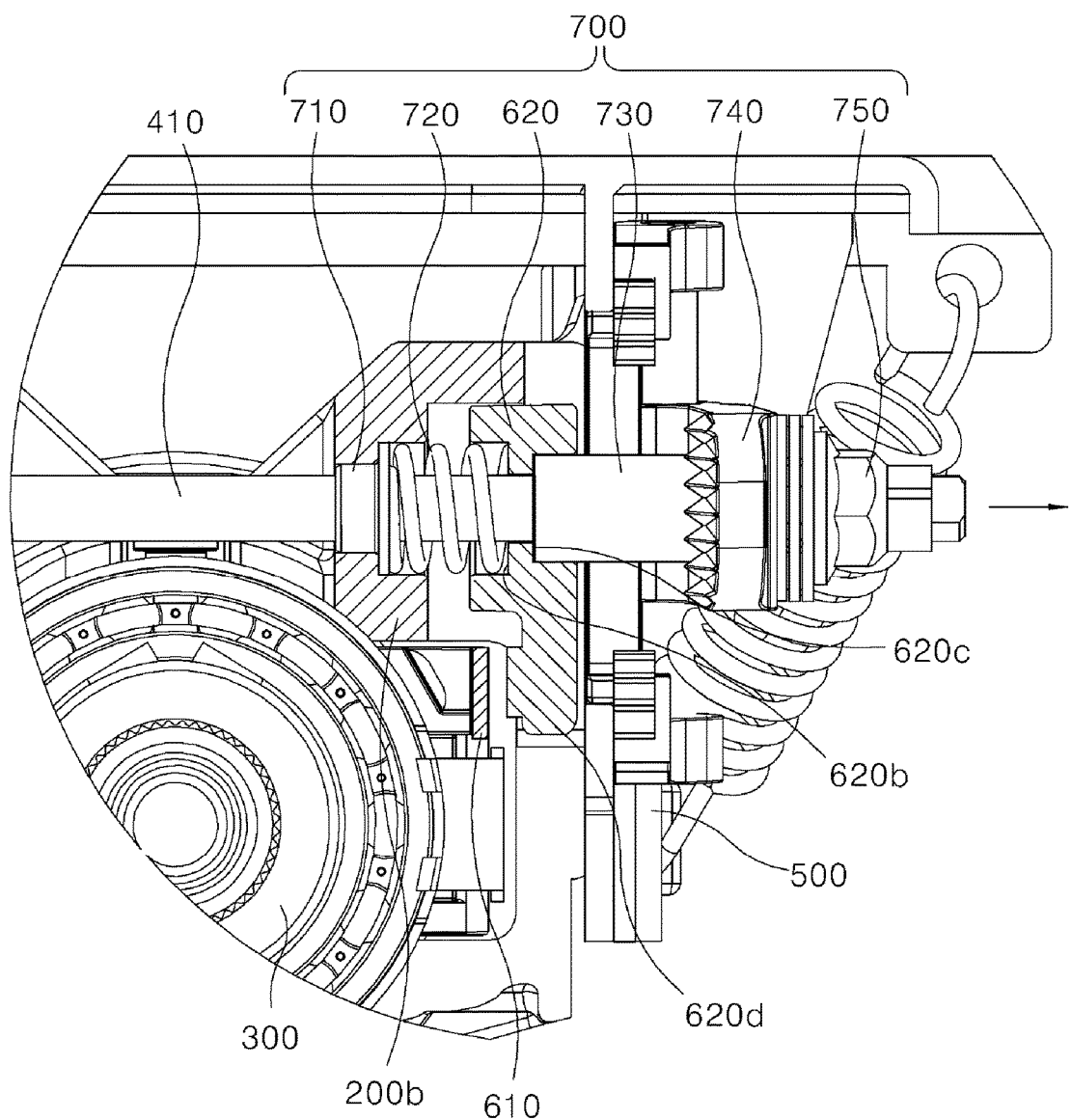
FIG. 14 is an expanded view illustrating a main portion of FIG. 13.
Figure 15:
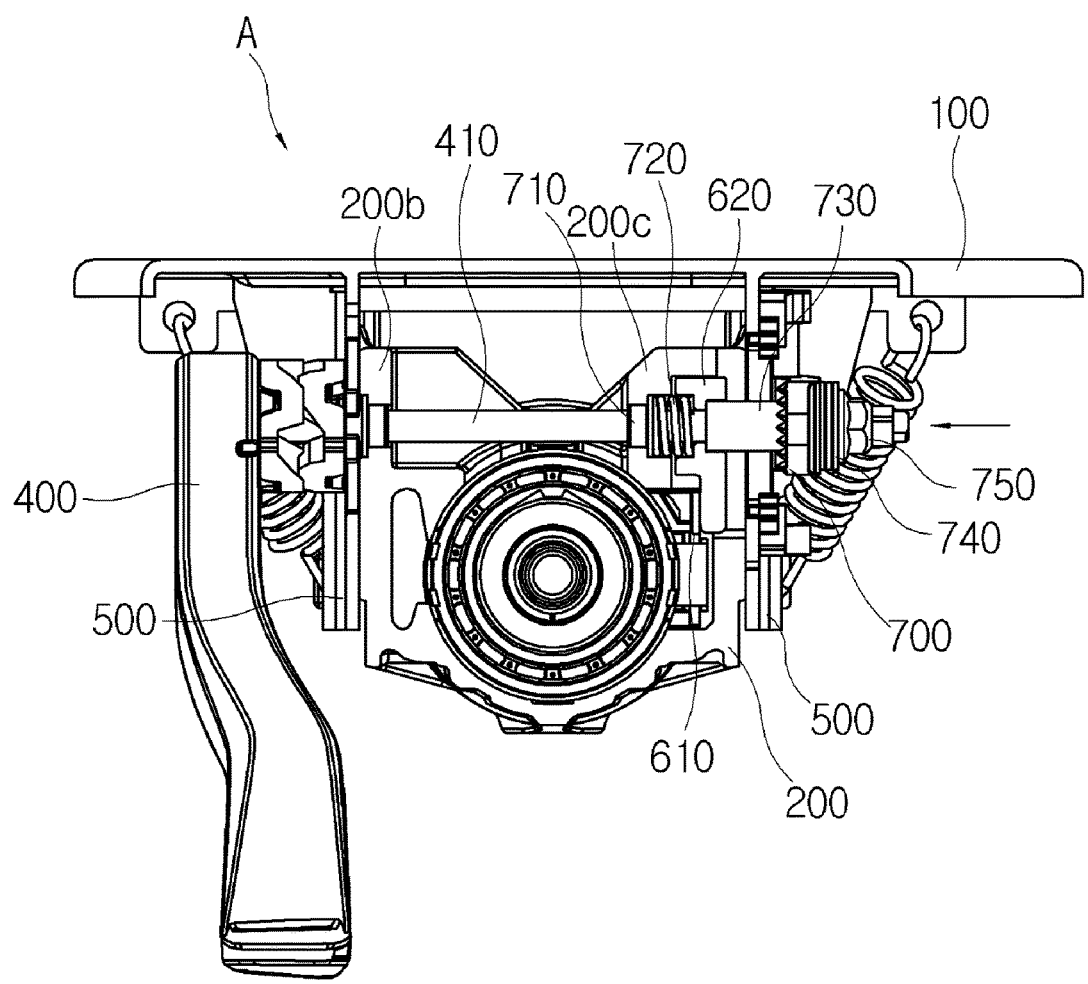
FIG. 15 is a front view illustrating a state in which the fixed gear is fixed to the fixing unit when the operating lever constituting the steering column illustrated in FIG. 9 is operated.
Figure 16:
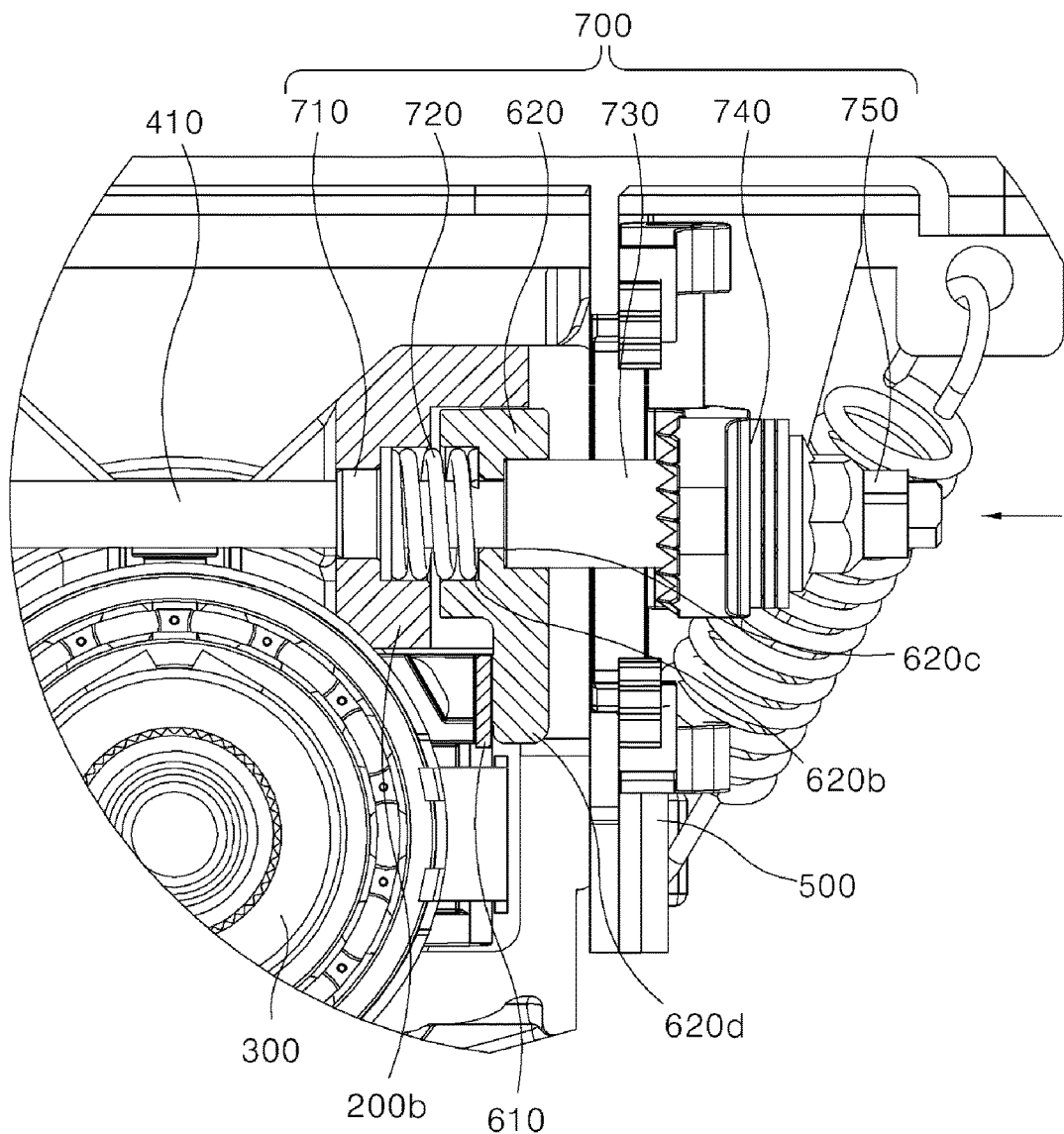
FIG. 16 is an expanded view illustrating a main portion of FIG. 15.

FIG. 9 is an assembled perspective view illustrating a steering column according to another embodiment of the present invention. FIG. 10 is an exploded perspective view of the steering column illustrated in FIG. 9. FIG. 11 is a partially expanded perspective view illustrating a housing constituting the steering column illustrated in FIG. 9. FIG. 12 is a perspective view illustrating a movable gear of the steering column illustrated in FIG. 9. FIG. 13 is a front view illustrating a state in which a fixed gear is disengaged from a fixing unit when an operating lever constituting the steering column illustrated in FIG. 9 is operated. FIG. 14 is an expanded view illustrating a main portion of FIG. 13. FIG. 15 is a front view illustrating a state in which the fixed gear is fixed to the fixing unit when the operating lever constituting the steering column illustrated in FIG. 9 is operated. FIG. 16 is an expanded view illustrating a main portion of FIG. 15.

Referring to FIGS. 9 to 15, the steering column, which is designated by reference numeral A, according to another embodiment of the present invention includes a mounting bracket 100, a tilting assembly 500, an adjustment bolt 410, a fixed gear 610, a movable gear 620, a fixing unit 700, etc.

The mounting bracket 100 fixes a housing 200, which has an inner tube 300 seated therein, to one side of a vehicle. The mounting bracket 100 has a predetermined thickness and width, and has a plurality of coupling holes which are formed at intervals therein for coupling and fixing.

Here, the mounting bracket 100 is arranged perpendicular to the housing 200 having the inner tube 300 seated therein so as to stably fix the housing 200 to one side of the vehicle.

In addition, the housing 200 has a predetermined size, and has a mounting space 200a formed therein for receiving the inner tube 300. The housing 200 has left and right coupling parts 200b and 200c which are respectively formed at both sides thereof.

That is, the inner tube 300 may be received in the mounting space 200a of the housing 200, the adjustment bolt 410 may be supported by the housing 200 while passing through the left and right coupling parts 200b and 200c, and the fixed gear 610, the movable gear 620, and the fixing unit 700 may be arranged in the right coupling part 220c.

In the right coupling part 200c of the housing 200, a portion, in which a bush mounting hole 200c-1 and a spring support hole 200c-2 are formed, is disposed at the upper portion of the fixed gear 610 while protruding inward from the right coupling part 200c, and a gear guide part 200c-3 is formed outside the spring support hole 200c-2 in a stepped manner so as to rectilinearly move the movable gear 620.

In more detail, the right coupling part 200c fixes a fixing bush 710 of the fixing unit 700, which is mounted to the adjustment bolt 410 passing through the tilting assembly 500, through the bush mounting hole 200c-1, and allows a spring 720 and the movable gear 620 to be rectilinearly moved through the spring support hole 200c-2 and the gear guide part 200c-3. Consequently, it is possible to prevent the spring 720 and the movable gear 620 from unstably moving and to prevent noise from occurring.

Here, since the bush mounting hole 200c-1 and the spring support hole 200c-2 are located inside the fixed gear 610, it is possible to prevent the fixing unit 700 from unstably operating while rectilinearly moving.

The gear guide part 200c-3 is cut and formed so as to support a portion of the upper portion of and the entire lower portion of the movable gear 620.

That is, the gear guide part 200c-3 is partially cut such that the movable gear 620 is not deviated from the eccentricity thereof while rectilinearly moving, thereby enabling the movable gear 620 to be accurately operated while the weight of the gear guide part is reduced.

In more detail, the gear guide part 200c-3 guides the entire upper portion of and a portion of the lower portion of the movable gear 620 when the fixed gear 610 engages with the movable gear 620. The gear guide part 200c-3 guides a half of the upper portion of and the entire lower portion of the movable gear 620 when the fixed gear is disengaged from the movable gear 620.

Meanwhile, the tilting assembly 500 is coupled to both sides of the inner tube 300, and rotates the housing 200 in the upward and downward directions relative to the mounting bracket 100 when the operating lever 400 is operated.

That is, the tilting assembly 500 is coupled to both sides of the inner tube 300 so as to be moved relative to the mounting bracket 100 in order to reduce a handle pushing force applied by a driver according to the degree of impact in the event of collision of the vehicle.

The tilting assembly 500 rotates about the adjustment bolt 410 depending on the operation of the operating lever 400 coupled to the adjustment bolt 410.

The operating lever 400 may be installed to the left or right of the tilting assembly 500. Here, the case where the operating lever 400 is installed to the left of the tilting assembly 500 will be described.

One side of the adjustment bolt 410 is coupled to the operating lever 400, and the other side thereof passes through the left and right coupling parts 200b and 200c constituting the housing 200.

That is, the adjustment bolt 410 has a predetermined diameter and length. One end of the adjustment bolt 410 is coupled to the operating lever 400, and the other end thereof is coupled to the fixing unit 700 through the housing 200. The adjustment bolt 410 serves to rectilinearly move the fixing unit 700 depending on the operation of the operating lever 400.

The fixed gear 610 is coupled to the inner tube 300 in the same line as the right coupling part 200c of the housing 200.

That is, the fixed gear 610 is longitudinally mounted to the inner tube 300, and is engaged with or disengaged from the movable gear 620 which is operated along with the operation of the operating lever 400.

Meanwhile, the fixing unit 700 is mounted to the other side of the adjustment bolt 410, and is rectilinearly moved depending on the operation of the operating lever 400. The fixing unit 700 may operate or stop the tilting assembly 500 in such a manner that the movable gear 620 is engaged with or disengaged from the fixed gear 610.

The fixing unit 700 includes a fixing bush 710 which is located at the right coupling part 200c of the housing 200 and is mounted to the adjustment bolt 410, a spring 720 which is located outside the fixing bush 710 and is mounted to the adjustment bolt 410, a bush tube 730 which is located outside the movable gear 620 located outside the spring 720 and is mounted to the adjustment bolt 410, and a washer 740 and a nut 750 which are located outside the bush tube 730 and are coupled to the adjustment bolt 410. Here, the movable gear 620 is located between the spring 720 and the bush tube 730 and is mounted to the adjustment bolt 410.

Although the movable gear 620 has been described to be one of the components of the telescopic assembly in the embodiment illustrated in FIGS. 1 to 8, the movable gear 620 may be described to be one of the components of the fixing unit 700 in another embodiment illustrated in FIGS. 9 to 15.

As described above, the fixing bush 710, the spring 720, the movable gear 620, the bush tube 730, the washer 740, and the nut 750 are sequentially mounted to the adjustment bolt 410, so that the fixing unit 700 may be rectilinearly moved depending on the operation of the operating lever 400.

In more detail, in the fixing unit 700, when the operating lever 400 is operated, the movable gear 620, the bush tube 730, the washer 740, and the nut 750 compress the spring 720 while moving in the right direction, and the movable gear 620 is engaged with the fixed gear 610. When the operating lever 400 is released, the movable gear 620, the bush tube 730, the washer 740, and the nut 750 are moved in the left direction by the elasticity of the operating lever 400 and the spring 720, and the movable gear 620 is disengaged from the fixed gear 610.

The movable gear 620 has a spring support part 620b and a tube support part 620c which are formed in a stepped manner at both sides thereof on the basis of a shaft through-hole 620a through which the adjustment bolt 410 passes. The movable gear 620 has a gear coupling part 620d which is elongated and formed at the lower portion thereof, and the gear coupling part 620d is engaged with or disengaged from the fixed gear 610.

Here, the gear coupling part 620d has the same width as the tube support part 620c so as to be smoothly engaged with or disengaged from the fixed gear 610 formed on the inner tube 300.

That is, the rotation of the movable gear 620 is prevented owing to moment by the tension of the spring 720 when the operating lever 400 is operated, by increasing the connection overlap between the movable gear 620 and the bush tube 730, thereby preventing the movable gear 620 from unstably engaging with the fixed gear 610.

In addition, the bush tube 730 has a predetermined diameter and length, and serves to rectilinearly move the movable gear 620 when the operating lever 400 is operated.

That is, the bush tube 730 is rectilinearly moved together with the movable gear 620 by the tension of the spring 720, and enables the movable gear 620 to be engaged with or disengaged from the fixed gear 610.

In addition, the washer 740 and the nut 750 are coupled to the end of the adjustment bolt 410 so as to fix and support the fixing unit 700. In this case, the washer 740 and the nut 750 may be a washer and a nut which are known.

Since the steering column includes the fixing unit 700 having the above configuration, the movable gear 620 is engaged with the fixed gear 610 while rectilinearly moving by the tension of the spring 720 when the operating lever 400 is operated. Therefore, it is possible to prevent the variation in operating force of the operating lever from occurring for each tele-position. In addition, when an impact is axially applied to the bush tube 730, an energy absorption function is immediately activated by the engagement of the fixed gear 610 with the movable gear 620 and thus the steering column may have the same energy absorption characteristics for each tele-position.

The configuration and assembly sequence of the steering column according to another embodiment will be described in more detail.

First, after forming the housing 200 which has a predetermined size, has the mounting space 200a formed therein for receiving the inner tube 300, and has the left and right coupling parts 200b and 200c respectively formed at both sides thereof, the inner tube 300, to which the fixed gear 610 is longitudinally mounted in the same line as the right coupling part 200c, is mounted in the mounting space 200a of the housing 200.

The mounting bracket 100, which has a predetermined thickness and width and has the coupling holes formed at intervals therein for coupling and fixing, is mounted to the upper portion of the housing 200, having the inner tube 300 seated therein, in the direction perpendicular to the housing 200.

Next, the tilting assembly 500, which rotates the housing 200 in the upward and downward directions relative to the mounting bracket 100 when the operating lever 400 is operated, is mounted to both sides of the inner tube 300.

After the operating lever 400 is disposed to the left of the tilting assembly 500, one side of the adjustment bolt 410 having a predetermined diameter and length is coupled to the operating lever 400, and the other side thereof passes through the housing 200.

Next, the assembly of the steering column A is completed by mounting the fixing unit 700 to the other side of the adjustment bolt 410, the fixing unit 700 including the fixing bush 710 which is located at the right coupling part 200c of the housing 200 and is mounted to the adjustment bolt 410, the spring 720 which is located outside the fixing bush 710 and is mounted to the adjustment bolt 410, the movable gear 620 which is mounted to the adjustment bolt 410 while being located outside the spring 720 and has gear teeth formed on the lower inner surface thereof, the bush tube 730 which is located outside the movable gear 620 and is mounted to the adjustment bolt 410, and the washer 740 and the nut 750 which are located outside the bush tube 730 and are coupled to the adjustment bolt 410.

Here, the assembly sequence of the steering column may also differ from that described above.

Hereinafter, the usage of the steering column having the above configuration will be described.

Referring to FIGS. 13 and 14, first, when the user operates the operating lever 400 such that the steering column tilts up and down, the adjustment bolt 410 connected to the operating lever 400 is moved in the left direction, and the movable gear 620, the bush tube 730, the washer 740, and the nut 750, which constitute the fixing unit 700, are rectilinearly moved in the left direction by the elasticity of the operating lever 400 and the spring 720, with the consequence that the movable gear 620 is disengaged from the fixed gear 610.

Referring to FIGS. 15 and 16, when the user operates the operating lever 400 after the steering column tilts up and down to a desired position, the adjustment bolt 410 connected to the operating lever 400 is moved in the right direction, and the movable gear 620, the bush tube 730, the washer 740, and the nut 750, which constitute the fixing unit 700, compress the spring 720 while rectilinearly moving in the right direction, with the consequence that the movable gear 620 is engaged with the fixed gear 610 so that the steering column is maintained in the state in which it tilts up and down.

Although the present invention has been described with respect to the illustrative embodiments, it will be apparent to those skilled in the art that various variations and modifications may be made without departing from the spirit and scope of the invention as defined in the following claims.

INDUSTRIAL APPLICABILITY

In accordance with the present invention, the usability of an operating lever can be consistently maintained by minimizing a variation in operating force of the operating lever, thereby improving the emotional quality of product. It is possible to a steering column having the same energy absorption characteristics for each tele-position since an energy absorption function is immediately activated by engagement of a fixed gear with a movable gear when an impact is axially applied to an inner tube.

What is claimed is:
1. A steering column comprising:
a mounting bracket;
a housing rotated in upward and downward directions relative to the mounting bracket;
an inner tube installed in a hollow of the housing so as to be axially extensible and contractible;
an operating lever installed to the mounting bracket and an adjustment bolt passing through the housing so as to be tightened and released;

a telescopic assembly comprising a fixed gear installed on the inner tube and a movable gear engaged with the fixed gear depending on axial movement of the adjustment bolt; and a bending plate provided between the inner tube and the fixed gear, wherein the fixed gear has a receiving groove into which the bending plate is inserted, and the bending plate has a restraint end fixed to the inner tube while being inserted into the receiving groove, and a free end exposed to the outside of the fixed gear.

2. The steering column according to claim 1, wherein the bending plate is rolled and inserted into the fixed gear when the inner tube is axially contracted relative to the housing.

3. The steering column according to claim 2, wherein the inner tube is fastened to the fixed gear by a rivet, and the rivet is destroyed when a load, which is equal to or greater than a predetermined value, is axially applied to the inner tube.

4. The steering column according to claim 1, wherein the fixed gear has a guide member for guiding the bending plate into the receiving groove.

5. The steering column according to claim 2, wherein the bending plate has a "U"-bent shape.

6. The steering column according to claim 1, further comprising:

a tilting assembly coupled to both sides of the inner tube, and rotating the housing in the upward and downward directions relative to the mounting bracket when the operating lever is operated; and a fixing unit mounted to the other side of the adjustment bolt, the fixing unit being rectilinearly moved depending on operation of the operating lever so that the movable gear is engaged with or disengaged from the fixed gear, thereby fixing or releasing the tilting assembly.

7. The steering column according to claim 6, wherein:

the housing has a right coupling part, a portion of which has a bush mounting hole and a spring support hole formed therein being disposed at an upper portion of the fixed gear while protruding inward from the right coupling part; and a gear guide part is formed outside the spring support hole in a stepped manner so as to rectilinearly move the movable gear.

8. The steering column according to claim 7, wherein the gear guide part is cut and formed so as to support a portion of an upper portion of and an entire lower portion of the movable gear.

9. The steering column according to claim 6, wherein the fixing unit comprises:

a fixing bush mounted to the adjustment bolt while being located at a right coupling part of the housing;

a spring mounted to the adjustment bolt while being located outside the fixing bush;

a bush tube mounted to the adjustment bolt while being located outside the movable gear located outside the spring; and a washer and a nut coupled to the adjustment bolt while being located outside the bush tube.

10. The steering column according to claim 9, wherein the movable gear has a spring support part and a tube support part formed in a stepped manner at both sides thereof on the basis of a shaft through-hole through which the adjustment bolt passes, and the movable gear has a gear coupling part elongated and formed at a lower portion thereof, the gear coupling part being engaged with or disengaged from the fixed gear.

11. The steering column according to claim 10, wherein the gear coupling part has the same width as the tube support part so as to be smoothly engaged with or disengaged from the fixed gear formed on the inner tube.

\* \* \* \* \*